United States Patent [19]

White

[11] 3,828,731
[45] Aug. 13, 1974

[54] ANIMAL LITTER

[76] Inventor: Percy LaVerne White, Arthur, Ontario, Canada

[22] Filed: Apr. 3, 1972

[21] Appl. No.: 240,828

[30] Foreign Application Priority Data

Mar. 6, 1972  Canada ............................ 136334

[52] U.S. Cl. .................................................. 119/1
[51] Int. Cl. ........................................... A01k 29/00
[58] Field of Search ............................. 119/1; 117/4

[56] References Cited
UNITED STATES PATENTS

| | | | |
|---|---|---|---|
| 2,708,418 | 5/1955 | Sugarman et al. | 119/1 |
| 3,286,691 | 11/1966 | McFadden | 119/1 |
| 3,059,615 | 10/1962 | Kuceski et al. | 119/1 |

*Primary Examiner*—Hugh R. Chamblee
*Attorney, Agent, or Firm*—George F. Dvorak et al.

[57] ABSTRACT

A litter or bedding for animals, particularly for domestic pets, and a method for making same is disclosed. The litter is biodegradable in water and soil environments and is flushable through normal household sanitary disposal systems in which aqueous medium it quickly decomposes to minimize pollution products. The litter consists primarily of high purity alphacellulose paper stock fibres in the form of pieces cut from a sheet of such material and into which has been incorporated at least one microbial inhibitor to inhibit the formation of odour-causing bacterial, and may include surface active agents to increase liquid absorbability of the cellulose stock material, as well as including a chlorophyll-containing compound. Minor amounts and up to 50 percent of sulphite cellulose paper stock may be combined with the alpha-cellulose material.

11 Claims, No Drawings

ANIMAL LITTER

The present invention relates to litter or bedding for animals, and particularly although not exclusively, to a litter for domestic pets such as cats, dogs, mice, rats, gerbils and the like. The invention also relates to a method for the preparation of such litter.

In general terms the litter according to the present invention consists of shavings or pieces of cellulosic material which have been treated with microbial inhibitors in amounts to inhibit the growth of odour-causing bacteria and fungi. The cellulosic material employed in the manufacture of the litter is a high quality stock such as alpha-cellulose fibres, or alpha-cellulose and sulphite cellulose fibres in various combinations. The alpha-cellulose material employed has an inherent characteristic of high liquid absorbability and this characteristic may be enhanced by the addition of suitable wetting agents and preferably the wetting or surface active agents are added when the alpha-cellulose material is present in combination with sulphite cellulose material.

The litter of the invention has the advantage of being readily disposable by sanitary household flushing thus providing easy disposal for apartment dwellers and people living in congested areas.

Moreover, the litter product which is formed primarily from a natural organic product is biodegradable (decomposed by microbes) in both soil and water environments, and because of the high quality cellulosic material employed, the litter when incinerated, results in a very low ash residue.

In addition to the additives, i.e., microbial inhibitors, and wetting agents discussed above the litter may also contain suitable chlorophyll compounds to reduce and minimize objectionable odours and to act as an additional absorbing agent.

It is the object of the present invention to provide an animal litter consisting of shavings and/or pieces of cellulosic material having incorporated therein suitable micro-bial inhibitors, and which litter is biodegradable in soil and water environments and is readily flushable through normal sanitary disposal systems and upon incineration results in small ash residue.

It is a further object of the invention to provide a method for preparing such animal litter.

These and other objects of the invention will become apparent from the following more detailed description.

The basic component in the litter is a high quality cellulosic material such as high quality paper stock including alpha-cellulose as the sole or major constituent. It is preferred that the cellulose material be substantially all alpha-cellulose which has a very high inherent capacity for liquid absorption. However, even with such a composition small amounts of a suitable wetting agent or agents may preferably be added to further enhance the degree of liquid absorption.

The preferred cellulose material is alpha-cellulose fibre stock but combinations of this fibre stock along with sulphite cellulosic paper stock may also be employed. Because of the greater inherent absorption of liquids by alpha-cellulose stock material, this is the preferred basic constituent, although as indicated, various combinations of alpha-cellulose stock and sulphite cellulose stock are within the ambit of the inventive concept. When the two cellulosic stock materials are used in combinations, satisfactory basic material may be achieved by employing the sulphite cellulose paper stock in percentages of from about 10% to 50% by weight. Alpha-cellulose has a greater affinity for liquid absorption than does sulphite cellulose and as a general rule the greater the percentage of sulphite cellulose present the greater the amount of surface active agent or agents that should be added.

The precise amount of surface active agent or agents that should be added will of course depend upon the exact constituents of the cellulosic material, but it is considered that the cellulosic material with or without wetting agents should have a wettability or become completely saturated in a matter of from 10 to 15 seconds after immersion in an aqueous medium.

To retard and minimize microbial growth a suitable microbial inhibitor or inhibitors is added during manufacture. The purpose of these microbial inhibitors is two-fold, with the first and primary function being to restrict and minimize odours produced by various micro-organisms which decompose the animal excretia, and the secondary function being to restrict and minimize microbial breakdown of the litter products if the litter products should be improperly stored under moist conditions.

Suitable microbial inhibitors which may be added include such compounds as benzaldehyde green ($C_{23}H_{25}Cl.N_2$), rose bengal and certain guaternary ammonium compounds and sodium and calcium propionate. These various microbial inhibitors may be present either singularly or in various combinations in the litter, but in a preferred combination at least two, three or more of such inhibitors are present. The microbial inhibitors are added to the cellulosic stock in amounts calculated to inhibit the growth of odour-causing bacteria and fungi. The compounds recited above inhibit the development of gram negative and gram positive bacteria, as well as certain filamentous fungi. The activities of these latter organisms on excreted organic compounds which contain carbon, nitrogen and sulphur are in part responsible for objectionable odours. The microbial inhibitors are added to the cellulosic stock in amounts which do not affect the decomposition and biodegradability of this product when the product is disposed of in water or soil environment. Other inhibitors could of course be used but the actual microbial inhibitors named provide very satisfactory inhibitory characteristics.

As a further additive to the litter of the invention, the use of certain wetting agents or surface active agents is preferred with their function being to assist in the absorption of faecal moisture and to assist in increasing sanitary flushability. The amounts of such surface active agents added to the cellulosic stock will depend of course on the actual composition of the cellulose stock used, or upon the actual percentages of two or more cellulose stocks used. Since each product, or combination has its own characteristic wetting time, the application of these surface active compounds will be determined by a study of the wetting time of the exact combinations. In practice, a maximum wetting time of from 10 to 15 seconds as a reference for determining rates of application of the surface active agents may be used as a guide in determining the amount of addition of the surface active agents with respect to the actual composition of the basic cellulose paper stock.

Various surface active agents which may be employed in the manufacture of the present litter may be grouped as follows:

1. Cationic surface active agents which have the following configuration;

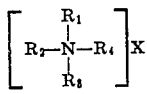

where $R_1$, $R_2$, $R_3$ and $R_4$ represent aromatic, or aliphatic groups, and where X represents an acid or a halid.

2. Anionic surface active agents of the following common configuration;

a. Linear alkyl sulphates

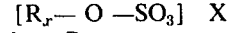

where $R_r$ represents a linear hydrocarbon chain, or $R_r$ can be a branched hydrocarbon chain and where X can be an ion such as $NH_4$, Na, or $PO_4$.

b. Alkylbenzene sulphonates of the following configuration;

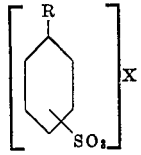

where R may represent a linear hydrocarbon chain, or a branched hydrocarbon, and X represents an ion such as $NH_4$, Na, or $PO_4$.

3. Nonionic surface active agents, the following configuration being most common;

$R-O-(C_2H_4O)_n-CH_2CH_2OH$ — a substituted polyoxyethylene alcohol, where R may represent a linear hydrocarbon chain, or a branched hydrocarbon chain, or the R substituent can also be an alkyl phenol which itself can possess either a linear hydrocarbon or a branched hydrocarbon as ring substituents.

A list of representative wetting agents, or surface active agents is shown in the following Table I. It is preferred to select those surface active agents having proven characteristics of biodegradation in water systems and in soil with a view to avoiding water and soil and environmental pollution.

The concentrations of surface active agents employed in the product may vary from 0.05% to 0.0005% by weight and as discussed previously, this concentration will depend on the paper stock, or ratios of paper stock used.

TABLE I a. Alkyl($C_8$-$C_{18}$) dimethyl benzyl ammonium chlorides.
b. Alkyl($C_8$-$C_{18}$) dimethyl dimethyl benzyl ammonium chlorides.
c. Alkyl)$C_8$-$C_{18}$) dimethyl ethyl benzyl ammonium chlorides.
D. Alkyl($C_8$-$C_{18}$) dimethyl dichloro benzyl ammonium chlorides.
e. Cetyl/myristyl/or lauryl dimethyl ammonium chlorides.
f. Lauryl sulphates.
g. Dodecyl sulphates.
h. Tetradecyl sulphates.
i. Polypropylene alkylbenzene sulphonates (ABS).
j. Linear alkylbenzene sulphonates (LAS).
k. Polyoxyethylene (20) sorbitan monopalmitate.
l. Polyoxyethylene (20) sorbitan monoleates.

The above listing of surface active agents is clearly only a partial listing and includes those agents which applicant has experimented with for compatibility with the litter product, and for marked wetting effects. Applicant is particularly conscious of the use of compounds which are biodegradable in water and soil environments.

As a still further addition, various grades of chlorophyll which is employed in appropriate organic solvents may be used. The amounts of the chlorophyll product added may vary from 0.01% to 0.001% by weight with these amounts being employed for the express purpose of absorbing possible objectionable odours from animal excretia. Chlorophyll compounds such as sodium copper chlorophyllin and sodium potassium copper chlorophyllin have been found to be satisfactory. Alternatively, one may employ finely ground plant material i.e. leaves, such as dried alfalfa, and forage grasses as a source of chlorophyll but commercially extracted chlorophyll products are readily available for use in such applications and are preferred.

In preparing the litter according to the present invention, one may employ paper stock sheets of alpha-cellulose fibre stock or combinations of the alpha-cellulose fibre stock with sulphite cellulose stock, with the various additives added to the sheets of such fibre stocks being applied by means of rollers and/or microspray applicators to the sheets during their passage at a predetermined rate of speed past the applicator. The microbial inhibitors, and if desired the wetting agents, may be applied automatically in this way by means of suitable conveying apparatus. The use of paper sheet stock of any length and having a thickness of one-sixteenth to one-eighth of an inch, and a width of about 12 or 36 inches has been found to be satisfactory.

The sheet of cellulosic paper stock thus treated is then placed in or conveyed to suitable evaporating cabinets or chambers to remove and recover residual organic solvents (such as methanol or acetone or various combinations) which have been used to apply the inhibitors and the surface active agents. The evaporating cabinets employed are kept under elevated temperatures and vacuum removal techniques are employed, to completely remove the solvents from the paper stock.

The sheets of cellulosic material thus treated then move to adjustable chipping or shaving machines to cut the paper sheet into shavings or pieces of litter of graded sizes. The resulting product is generally soft and fluffy, and on a general average, a litter piece size of about one-half by five-eights inch by about one-sixteenth to one-eighth inch thick is found to be preferable. The shavings and pieces are then subjected to a suitable contrifugal cleaning unit to remove very fine particles of paper and dust. Automatic feeding assembly lines to deliver the finished product to a suitable container filling assembly line may also be employed to advantage. Suitable automated machinery for the conveying, applying, evaporating, cutting, cleaning and screening steps may advantageously be employed.

I claim:

1. A biodegradable and sanitary flushable litter or bedding for animals comprising pieces and shavings of substantially pure organic cellulosic material having a high inherent characteristic for liquid absorption and including at least one microbial inhibitor to inhibit the growth of odour-causing bacterial and fungi incorporated therein, the cellulosic material comprising at least one member of the group consisting of alpha-cellulose, and a major proportion of alpha-cellulose in combination with a minor proportion of other cellulosic material.

2. Litter according to claim 1 wherein the cellulosic material is alpha-cellulose stock fibres.

3. Litter according to claim 1 wherein the cellulosic material comprises a major proportion of alpha-cellulose in combination with a minor proportion of sulphite cellulose.

4. Litter according to claim 3 wherein the sulphite cellulose is present in amounts of from 10 to 50% by weight.

5. Litter according to claim 1 wherein the said at least one microbial inhibitor is selected from the group consisting of benzaldehyde green, rose bengal, sodium propionate, calcium propionate and quaternary ammonium compounds and combinations thereof.

6. Litter according to claim 1, including at least one surface active agent selected from the group comprising 1. cationic surface active agents of the following general formula:

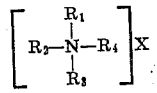

where $R_1$, $R_2$, $R_3$ and $R_4$ represent aromatic or aliphatic groups, and where X represents an acid or a halide;

2. anionic surface active agents of the following general formula:
      a. linear alkyl sulphates $[R_x—O—SO_3] X$ where $R_x$ represents a linear hydrocarbon chain or $R_x$ can be a branched hydrocarbon chain, and where X can be an ion such as $NH_4$, Na, or $PO_4$;

b. alkylbenzene sulphonates of the following general formula:

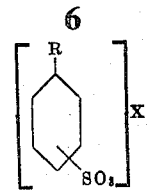

where R may represent a linear hydrocarbon chain, or a branched hydrocarbon, and X represents an ion such as $NH_4$, Na, or $PO_4$;

3. nonionic surface active agents of the following general formula:

$R—O—(C_2H_4O)_n—CH_2CH_2OH$ — a substituted polyoxyethylene alcohol, where R may represent a linear hydrocarbon chain, or a branched hydrocarbon chain, or the R substituent can also be an alkyl phenol which itself can possess either a linear hydrocarbon or a branched hydrocarbon as ring substituents.

7. Litter according to claim 1, including at least one surface active agent selected from the group consisting of alkyl($C_8$-$C_{18}$) dimethyl benzyl ammonium chlorides, alkyl($C_8$-$C_{18}$) dimethyl dimethyl benzyl ammonium chlorides, alkyl($C_8$-$C_{18}$) dimethyl ethyl benzyl ammonium chlorides, alkyl($C_8$-$C_{18}$)dimethyl dichloro benzyl ammonium chlorides, cetyl/myristyl/or lauryl dimethyl ammonium chlorides, lauryl sulphates, dodecyl sulphates, tetradecyl sulphates, polypropylene alkylbenzene sulphonates (ABS), linear alkylbenzene sulphonates (LAS), polyoxyethylene (20) sorbitan monopalmitate, polyoxyethylene (20) sorbitan monoleates.

8. Litter according to claim 1 including a chlorophyll containing compound selected from the group consisting of sodium copper chlorophyllin and sodium potassium copper chlorophyllin.

9. A biodegradable and sanitary flusable litter or bedding for animal pets comprising shavings and pieces of substantially pure organic cellulose material having incorporated therein as microbial inhibitors benzaldehyde green, rose bengal and at least one quaternary ammonium chloride, and at least one wetting or surface active agent, and at least one chlorophyll-containing one member of the group consisting of alpha-cellulose, and alpha-cellulose in combination with other cellulosic material.

10. A litter according to claim 9 wherein a major proportion of the cellulose material is alpha-cellulose and a minor proportion is sulphite cellulose.

11. Litter according to claim 9 wherein the cellulosic material is alpha-cellulose fiber stock.

* * * * *